United States Patent Office 3,244,653
Patented Apr. 5, 1966

3,244,653
COATING COMPOSITIONS COMPRISING METHYLOL GROUP-CONTAINING ESTERS AND VIC-EPOXY RESINS
Howard J. Wright and Richard D. Kincheloe, Kansas City, Mo., assignors to Cook Paint & Varnish Company, Kansas City, Mo., a corporation of Delaware
No Drawing. Filed Nov. 13, 1962, Ser. No. 237,364
17 Claims. (Cl. 260—23)

The present invention relates to certain novel resinous coating compositions based on Diphenolic Acid and the use of these compositions, particularly for coating can interiors or the like.

As will be appreciated, the requirements placed on materials for use in coating the interiors of cans and other containers are extremely demanding. These requirements are more than adequately satisfied by the present compositions which have demonstrated especially outstanding characteristics in this particular area of use. Accordingly, the principal object of the present invention is to provide new resinous coating compositions and cans coated therewith which represent a very significant advance in the art. Other objects will also be hereinafter apparent.

Broadly described, the coating compositions of the invention comprise a blend of (1) The reaction product of Diphenolic Acid, at least one polyhydroxy organic compound of the formula R(OH)$_n$ where R is hydrocarbon and $n$ represents the average number of hydroxyl groups, an oil acid, and formaldehyde;
(2) A vic-epoxy resin;
(3) Methylol phenol ether;
(4) Vinyl resin; and
(5) Crosslinking agent.

The success of the invention is due to the use of the above indicated combination of components. The manner in which these components react or cooperate to give the unique advantages of the present compositions is not understood. However, it is apparent that each of these components is critical to success, as evidenced by the unusual superiority of the present products over compositions which include less than all of the indicated components or compositions which include a substitute for one or more of the indicated components. This unique superiority for the present products is evidenced, for example, by increased process resistance to various foods, improved flexibility in can forming operations and exceptionally high alkali resistance.

While the combination of components described herein is critical to the success of the invention, it will be recognized that proportions for the various components (1) to (5) referred to above can be widely varied depending, for example, on the nature of the components themselves. However, as a general rule, proportions of the following order may be used per 100 parts of the total formulation (solids basis).

Component (1): Diphenolic Acid reaction product from 20 to 70 parts with 30 to 60 parts preferred;
Component (2): Vic-epoxy resin 76 to 12 parts with 63 to 27 preferred. Usually this component is used in solution comprising 50% by weight of resin solids;
Component (3): Methylol phenol ether 3 to 12 parts with 5 to 9 parts preferred;
Component (4): Vinyl polymer 0.5 to 3 parts polymer with 1 to 2 parts preferred. This is usually used in the form of a solvent solution containing about 25% by weight polymer solids, balance solvent;
Component (5): Crosslinking catalyst 0.5 to 3 parts with 1 to 2 parts preferred.

The reaction product (1) used herein may comprise the resinous material obtained by esterifying a resinous polyol, as the polyhydroxy compound R(OH)$_n$ with Diphenolic Acid and an oil acid followed by condensation with formaldehyde. As an alternative, the resinous polyol may be replaced by a monomeric polyhydroxy compound and preferably mixtures of two such compounds, desirably glycerine and ethylene glycol. In this latter case, it is also desirable to include a dibasic acid, e.g. fumaric acid, for the esterification reaction.

Further operational details for the compositions of the present invention and their methods of use are set forth below:

COMPONENT (1)—DIPHENOLIC ACID REACTION PRODUCT

As indicated above, the Diphenolic Acid reaction product may be made using either resinous polyols or monomeric polyhydroxy compounds. It has been found that many of the known resinous polyols (see, for example, those disclosed in U.S. patents 2,907,723 and 2,907,724) are unsuitable for use herein due to reduced process resistance. In particular, the resinous polyols used in the present invention must be ether-free polyhydroxy hydrocarbons. Usually, these polyols will have a molecular weight extending from about 500 to about 3000 or even higher. A preferred resinous polyol is identified as X–450 which is characterized by the unit:

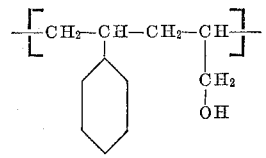

The molecular weight of this particular product is about 1150. However, other resinous polyols of essentially the same composition but of differing molecular weights are also suitable for use herein. Thus, the above mentioned X–450 resinous polyol is one of a series which also includes polyols X–250, X–330, X–330 and X–750. Another generally similar resinous polyol is available as RJ–100.

In lieu of the resinous polyol, ether-free nonresinous or monomeric polyhydroxy alcohols may be used, as indicated above. Illustrative of these are such materials as ethylene glycol, trimethylol propane, propylene glycol, glycerine, trimethylol ethane, pentaerythritol, neopentyl glycol, hydrogenated bisphenol, cyclohexane dimethanol and the like. In this particular embodiment, it also is generally desirable to use a mixture of alcohols, for example, ethylene glycol and glycerine, usually in the ratios of 40 to 60% by weight glycol and 60 to 40% by weight glycerine, although ratios outside this range may also be utilized depending on the hydroxyl functionality of the polyols used and the amount and type of acid to be esterified therewith.

The oil acids used in conjunction with Diphenolic Acid to esterify the polyhydroxy compound are desirable tall oil fatty acids. However, other oil acids of the drying or non-drying type may be used. This includes, without limiting the invention thereto, linseed oil, soya oil, dehydrated castor oil, safflower oil and/or coco oil fatty acids. When a nonresinous polyhydroxy compound is used, it is also preferred to include a dibasic acid in the esterification reaction. Typically suitable dibasic acids are fumaric, adipic, maleic, phthalic, isophthalic, terephthalic, succinic, sebacic, azelaic, itaconic and dimerized fatty acids (e.g. 36 carbon acids), with fumaric acid preferred.

The amounts of the acid components used for esterification of the polyol can be widely varied but generally the total amount of acid should be sufficient to at least essentially completely esterify all of the hydroxy groups in the polyol. To this end, the ratio of oil acid to diphenolic acid will generally come in the range of about 1:1 to 1:40 on a weight basis, while the amount of dibasic acid, if and when used with nonresinous polyol, should be sufficient to effect resinification or polycondensation of the polyol. The resulting esterification product should have an acid number of 30 or below.

The esterification product obtained by reacting the polyol with Diphenolic Acid, oil acids and possibly dibasic acid, is preferably reacted with formaldehyde in a solvent and in the presence of an appropriate condensation catalyst, typically phosphoric acid. Other catalysts which may be used, in lieu of the phosphoric acid, are sulphuric, p-toluenesulphonic, formic acid, maleic and hydrochloric acids, and basic catalysts such as sodium hydroxide, ammonium hydroxide and amines, with the acid catalysts preferred. The amount of catalyst will usually fall in the range of .5–3% by weight, based on the diphenolic acid, although different proportions may also be used, depending on the catalyst and other conditions.

The condensation with formaldehyde, is preferably carried out in the presence of an inert solvent, typically butanol and butyl Cellosolve, using a ratio of formaldehyde to Diphenolic Acid which will normally fall in the range of 1:1 to 5:1, on a mol basis. The condensation may be carried out at 100–125° C. under azeotropic conditions until the desired viscosity is obtained. Paraformaldehyde or formalin may also be used for this step.

At the completion of the formaldehyde condensation, the percent nonvolatiles or solids is desirably of the order of 40 to 80% in solvent. Where the solids content is high, it is preferred to add further solvent or diluent to facilitate subsequent use.

Diphenolic Acid has the formula

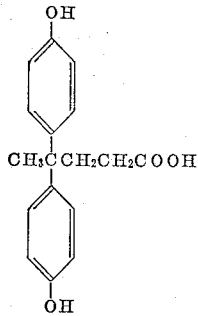

It is also described as 4,4-bis(4'-hydroxyphenyl)pentanoic acid or gamm,gamma-bis-(p-hydroxyphenyl)valeric acid. It is made (according to British Patent 768,206) by condensing 2.25–4.0 moles of phenol with 1 mole of levulinic acid (see Merck Index, 1960, p. 380).

COMPONENT (2)—VIC-EPOXY RESIN

The vic-epoxy resin component is preferably used herein in the form of a solution in inert organic solvent. The solvent may conveniently be xylol and/or Cellosolve acetate although such solvents as butanol and other alcohols or higher boiling aromatics (e.g. Solvesso 150) may also be used.

Illustrative of the vic-epoxy resins which may be used herein are the complex epoxide resins which are polyether derivatives of polyhydric phenols with such polyfunctional coupling agents as polyhalohydrins, polyepoxides, or epihalohydrins. These compositions may be described as polymeric polyhydric alcohols having alternating aliphatic chains and aromatic nuclei connected to each other by either linkages, containing terminal epoxide groups and free from functional groups other than epoxide and hydroxyl groups. Illustrative examples of these epoxide materials are described in U.S. Patents 2,456,408, 2,503,- 726, 2,615,007, 2,615,008, 2,668,807, 2,688,805 and 2,698,315. Well-known commercial examples of these resins are the Epon resins, such as Epon 1007 as well as Epon 828, 1001, 1004 and the like.

A wide variety of other types of vic-epoxy resins may be used herein including those described in U.S. Patent 2,907,723.

COMPONENT (3)—METHYLOL PHENOL ETHER

The methylol phenol ether component may be illustrated by the general formula:

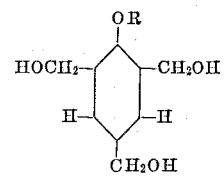

where R represents an unsaturated aliphatic group containing at least 3 carbon atoms, e.g. allyl. One such condensation product which is of especially desirable use herein is available as Methylon 75108.

COMPONENT (4)—VINYL POLYMER

It is important to the success of the invention that the vinyl polymer be compatible with the other components of the system described herein. The polymer should have a sufficiently high molecular weight to provide good film-forming characteristics with freedom from voids and the like. This component may be blended with the others in the form of a solution in organic solvent. A preferred vinyl polymer for use herein is polyvinyl butyral available as Vinylite XYHL. Polyvinyl formal may also be used.

COMPONENT (5)—CROSSLINKING CATALYST

Phosphoric acid is the preferred crosslinking catalyst for use in the blends described herein although other acids of comparable strength may be used provided they are non-toxic.

PREPARATION

The compositions of the invention may be easily prepared by blending together the five components mentioned above. Usually the vic-epoxy resin, diphenolic and/or vinyl polymer component will include solvent but, to facilitate blending, additional solvents such as xylol, diacetone or the like, may be added. Obviously whatever additional solvent is used should be the same as, or compatible with, solvents already associated with the components. The thus blended composition is ready for use in coating can interiors although in some instances it may be desirable to add other conventional components such as fillers, opacifiers, pigments, etc.

The invention is illustrated, but not limited, by the examples set forth below wherein parts and percentages are by weight unless otherwise indicated:

Example 1

The following components were used to prepare the resinous Diphenolic Acid component identified as component (1) above:

| | Parts |
|---|---|
| X–450 | 21.90 |
| Diphenolic acid | 21.10 |
| Tall oil fatty acid | 6.10 |
| Butyl Formacel | 14.00 |
| Phosphoric acid | 0.32 |
| Butyl alcohol | 36.58 |

The polyol (X–450) was esterified with the diphenolic acid and tall oil fatty acid by charging these reactants into a 3 liter, 3-necked flask equipped with an agitator, thermometer, water trap and condenser. The reactants were heated to about 200° C. and held under reflux for an acid number of less than 30. Butyl alcohol was added to the reaction product and agitated until the polyester was dissolved. Butyl Formcel (40 parts formaldehyde in 53 parts butyl alcohol and 7 parts water) was then added followed by the phosphoric acid catalyst. The reactants were then held at a temperature between 100° and 125° C. for 6–12 hours during which time water was removed from the trap.

The resulting condensation product was 50% nonvolatiles having a Gardner-Holdt viscosity of E to H suitable for use in preparing the coating compositions of the invention.

*Example 2*

Example 1 above was repeated except that the Diphenolic Acid resinous component was prepared using the following components:

| | Parts |
|---|---|
| Diphenolic Acid | 40.79 |
| Glycerine | 4.86 |
| Ethylene glycol | 4.37 |
| Tall oil fatty acid | 3.64 |
| Fumaric acid | 7.04 |
| Butyl Formcel | 26.70 |
| Phosphoric acid | 0.57 |
| Butyl Cellosolve | 12.03 |

The resulting condensation product comprised 70% nonvolatiles. This product was reduced to 50% nonvolatiles by the addition of amyl alcohol to give a T or V viscosity (Gardner-Holdt) and is ready for use in preparing the blends of the invention.

*Example 3*

A coating composition was prepared by mixing together the following components:

| | Parts |
|---|---|
| Product of Example 1 (50% nonvolatiles) | 26.400 |
| Epon 1007 solution (50% nonvolatiles in xylol and Cellosolve acetate) | 38.900 |
| Methylon 75108 | 3.185 |
| Vinylite XYHL solution (24% in methyl isobutyl ketone and methanol) | 1.600 |
| Phosphoric acid (75% aqueous solution) | .475 |
| Xylol | 10.000 |
| Diacetone | 19.440 |

The resulting product was ready for use but, if desired, aluminum pigment or other conventional can coating components, could be added, to coat food and non-food containers. Cans coated with this material are very resistant to staining in sulfur bearing foods like corn and green pea soup. The coating also shows outstanding performance in canned meat products such as stew, chili, chicken and the like. Other desirable uses are for coating pressure (or aerosol type) cans where the coating must have not only flexibility for fabrication but also possess good product resistance. An outstanding advantage of this composition and the other products described herien are that the coatings resulting therefrom are extremely useful in drawn aluminum cans where the aluminum sheet is first coated and then drawn into cans. These coatings also demonstrate very good alkali and acid resistance.

*Example 4*

A coating composition was prepared by mixing together the following components:

| | Parts |
|---|---|
| Product of Example 2 (50% non-volatiles) | 24.5 |
| Epon 1007 solution (50% nonvolatiles in xylol and Cellosolve acetate) | 33.6 |
| Methylon 75108 | 5.6 |
| Vinylite XYHL solution (24% solution as in Example 3) | 1.7 |
| Phosphoric acid (75%) | 0.8 |
| Xylol | 12.3 |
| Diacetone | 21.5 |

The resulting coating, with or without the addition of aluminum pigment, is highly effective as an interior coating of cans for meat products and vegetables, and particularly sulfur bearing products.

The coating compositions used herein may be applied to the metal substrate in any conventional manner, e.g. by spraying or roller coating. Any of the usual metals from which cans are formed may be coated according to the invention, typically various grades of tin plate, CMQ steel, chemically treated steel, terne plate, aluminum and etched or otherwise chemically treated aluminum.

After the resin composition has been applied thereto, the substrate is baked to complete the coating, preferably at a temperature between 250° F. and 2000° F. for a period ranging from about 10 to 30 minutes at the lower temperature and 1 to 2 seconds at the higher temperature. Optimum baking conditions vary depending upon other operating factors, particularly the nature of the composition utilized.

It will be appreciated that various modifications may be made in the invention described herein. Thus, as an illustration, the amount of catalyst or other components used in the above examples may be varied to obtain characteristics desired for any particular situation.

Accordingly, the scope of the invention is defined in the following claims wherein we claim:

1. A composition comprising a blend of:
   (1) the formaldehyde condensation product of the esterification product of 4,4-bis(4'-hydroxyphenyl)-pentanoic acid, at least one ether-free polyhydroxy organic compound having the formula $R(OH)_n$ where R is hydrocarbon and $n$ represents the average number of hydroxy groups in said compound, and an oil acid;
   (2) a vic-epoxy resin;
   (3) methylol phenol ether of an unsaturated alcohol;
   (4) vinyl acetal type resin; and
   (5) an acid crosslinking catalyst.

2. The composition of claim 1 wherein said polyhydroxy compound is a resinous polyol.

3. The composition of claim 1 wherein said polyhydroxy compound is a monomeric polyhydroxy alcohol and said esterification product includes a dibasic acid.

4. The composition of claim 1 wherein said polyhydroxy component is a mixture of ethylene glycol and glycerine.

5. The composition of claim 1 wherein said vinyl resin is polyvinyl butyral.

6. The composition of claim 1 wherein said crosslinking catalyst is phosphoric acid.

7. A coating composition comprising a blend of:
   (1) the condensation product of formaldehyde with the esterification product of 4,4-bis(4'-hydroxyphenyl)pentanoic acid, a resinous polyol, characterized by the unit:

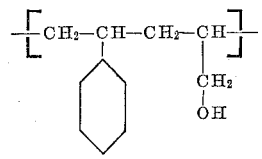

with a molecular weight of between about 500 and 3000, and tall oil fatty acid, said esterification product having an acid number not in excess of 30 with essentially all of the hydroxy groups therein esterified;
   (2) a vic-epoxy resin comprising a polymeric polyhydric alcohol having alternating aliphatic chains and aromatic nuclei connected to each other by ether linkages, containing terminal epoxide groups and free from functional groups other than epoxide and hydroxyl groups;

(3) a methylol phenol ether having the formula:

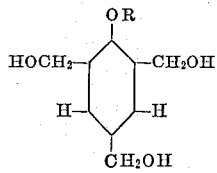

where R is an unsaturated aliphatic group containing at least 3 carbon atoms;
(4) polyvinyl butryal of sufficient molecular weight to be film forming; and
(5) phosphoric acid.

8. A coating composition according to claim 7 containing per 100 parts by weight of said composition, on a solids basis:

20–70 parts of the reaction product (1);
76–12 parts of the vic-epoxy resin;
3–12 parts of the methylol phenol ether;
0.5–3 parts of the polyvinyl butyral; and
0.5–3 parts of the phosphoric acid.

9. A coating composition comprising a blend of:
(1) the condensation product of formaldehyde with the esterification product of 4,4-bis(4'-hydroxyphenyl)pentanoic acid, an ether-free monomeric polyhydroxy alcohol, dibasic acid and tall oil fatty acid, said esterification product having an acid number not in excess of 30 with essentially all of the hydroxy groups therein esterified;
(2) a vic-epoxy resin comprising a polymeric polyhydric alcohol having alternating aliphatic chains and aromatic nuclei connected to each other by ether linkages, containing terminal epoxide groups and free from functional groups other than epoxide and hydroxyl groups;

(3) a methylol phenol ether having the formula:

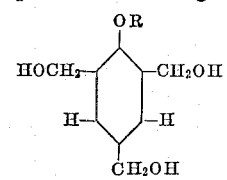

where R is an unsaturated aliphatic group containing at least 3 carbon atoms;
(4) polyvinyl butyral of sufficient molecular weight to be film-forming; and
(5) phosphoric acid.

10. The composition of claim 9 wherein said dibasic acid is fumaric acid.

11. The composition of claim 1 wherein the ratio of oil acid to 4,4-bis(4'-hydroxyphenyl)pentanoic acid is in the range of about 1:1 to 1:40 on a weight basis and the ratio of formaldehyde to 4,4-bis(4'-hydroxyphenyl)pentanoic acid in said condensation product is in the range of 1:1 to 5:1 on a mol basis.

12. A coating composition according to claim 11 including at least one inert solvent, said solvent being compatible with each of said components.

13. A coating composition according to claim 12 containing about 50% nonvolatiles.

14. A metallic can, the interior of which is coated with the baked composition of claim 1.

15. A metallic can, the interior of which is coated with the baked composition of claim 8.

16. The process which comprises coating a metal sheet with the composition of claim 1 and then baking the same.

17. The process of claim 16 wherein said metal sheet is shaped into a can after baking with the coating constituting the interior of said can.

References Cited by the Examiner

UNITED STATES PATENTS

| | | | |
|---|---|---|---|
| 2,979,418 | 4/1961 | Dipner | 260—831 |
| 2,986,546 | 5/1961 | Naps | 260—831 |
| 3,008,848 | 11/1961 | Annonio | 260—831 |
| 3,058,844 | 10/1962 | Johnson et al. | 280—831 |
| 3,123,582 | 3/1964 | Tryzna et al. | 260—831 |

LEON J. BERCOVITZ, *Primary Examiner.*